UNITED STATES PATENT OFFICE.

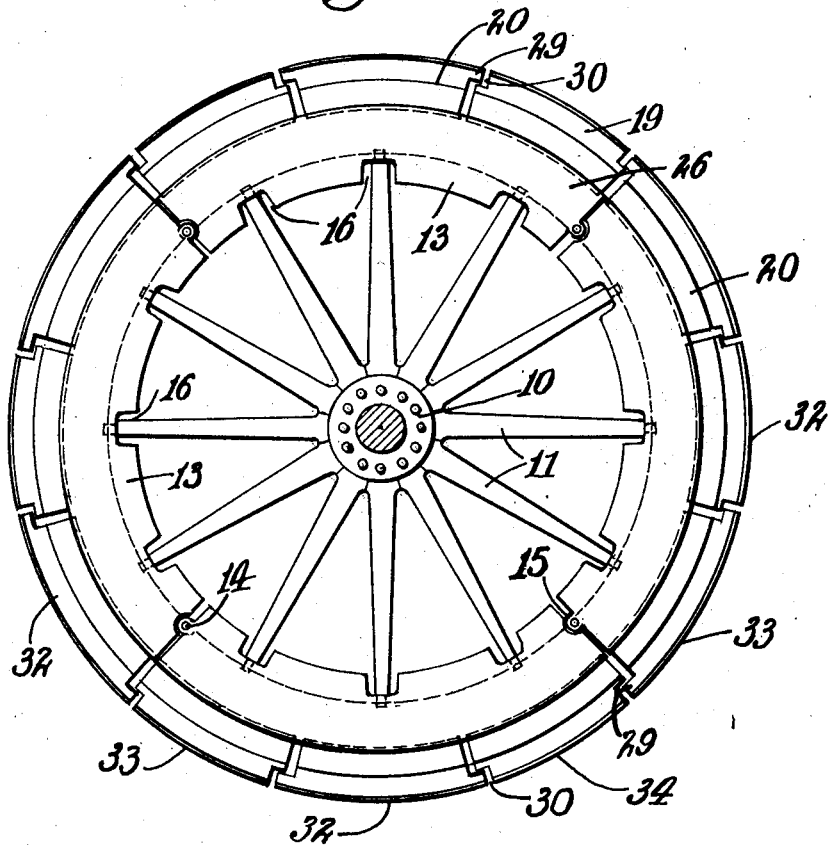
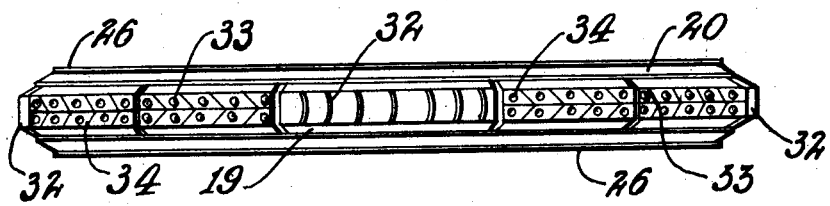

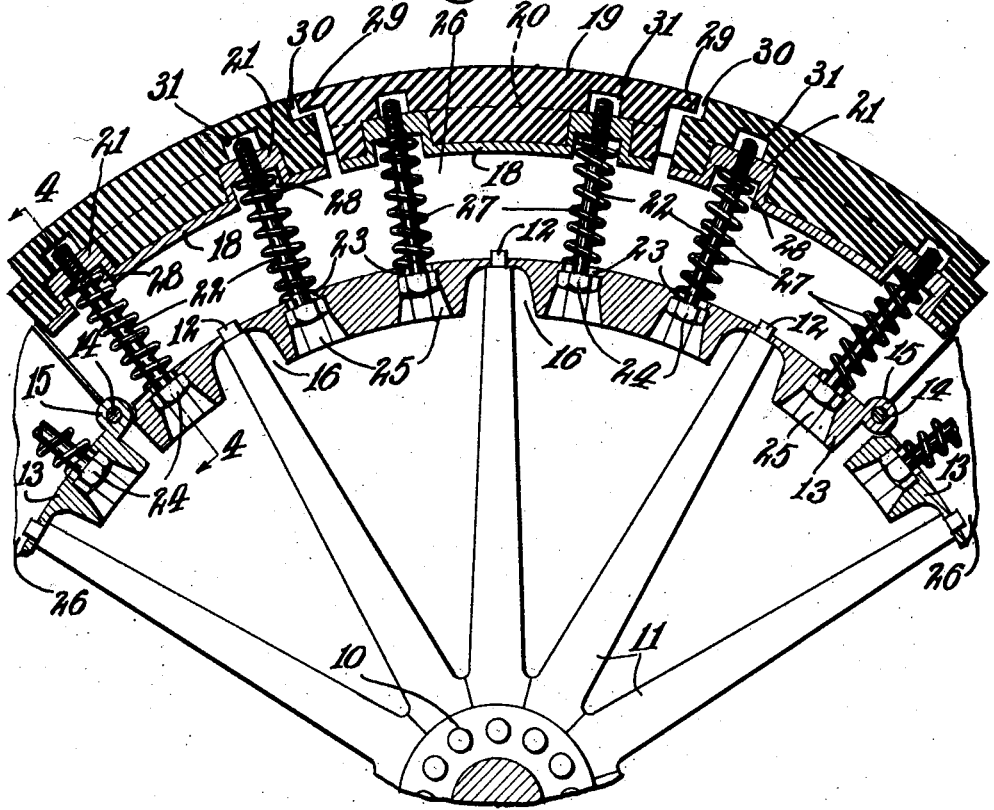

JOSEPH ARDO, OF NEWHALL, WEST VIRGINIA.

RESILIENT WHEEL.

1,391,660.  Specification of Letters Patent.  Patented Sept. 27, 1921.

Application filed September 17, 1920. Serial No. 410,974.

*To all whom it may concern:*

Be it known that I, JOSEPH ARDO, citizen of the United States, residing at Newhall, in the county of McDowell and State of West Virginia, have invented certain new and useful Improvements in Resilient Wheels, of which the following is a specification.

This invention relates to vehicle wheels, being intended more particularly for embodiment in automobile wheels, and having more particular reference to the construction of the wheel to make the same resilient.

The invention has for a general object the provision of a novel and improved type of resilient wheel of simple and inexpensive construction.

More specifically speaking the invention has for an object to provide a resilient wheel arranged in a plurality of units or sections which may be readily replaced individually if worn or broken.

For further comprehension of the invention, and of the objects and advantages thereof, reference will be had to the following description and accompanying drawings, and to the appended claims in which the various novel features of the invention are more particularly set forth.

Figure 1 of the drawings is a face view of an automobile wheel having the invention applied thereto.

Fig. 2 is an edge view thereof.

Fig. 3 is an enlarged fragmentary section looking in the same direction as Fig. 1, this view being taken on the line 3—3 of Fig. 4.

Fig. 4 is a transverse section on the line 4—4 of Fig. 3.

In the drawings 10 indicates the hub of an automobile wheel and 11 the spokes radiating therefrom, and provided with diminished ends 12, these parts being of ordinary construction except that the spokes are comparatively short in proportion to the total diameter of the wheel, one feature of the invention having reference to the mounting of a novel type of felly upon the spokes.

In constructing the felly of my improved wheel I preferably form the same of a series of sections 13 which are secured together by means of pins or bolts 14 which pass through eyes 15 formed on the ends of the sections. These sections are placed individually upon the spokes 11 and are then secured together by the pins 14, the sections having suitable openings therein which receive the diminished ends 12 of the spokes and being preferably formed on their inner faces with enlarged recesses 16 which register with these openings.

Upon this felly is mounted the resilient structure of the wheel which comprises a series of movable rim sections 18 of metal upon which are mounted the rubber tread members 19, the rim sections having side flanges 20 which engage the sides of the tread members.

Formed on the outer face of each of the rim sections toward opposite ends thereof are a pair of bosses 21 which receive the means whereby the rim sections are mounted on the felly. As here shown this means comprises a pair of bolts 22 for each section whose threaded ends project outwardly and engage in suitable tapped borings in the bosses 21. These bolts project through suitable openings 23 in the felly members which are enlarged to permit of slight lateral movement of the bolts, therein, the bolts having heads 24 thereon located and guided in enlarged sockets 25 in the inner faces of the felly members 13, which register with the openings 23.

These sockets 25, it will be noted are flared in the plane of the wheel as clearly shown in Fig. 3 while transversely of the wheel they present parallel walls with which the sides of the bolt heads 24 have a sliding fit. This construction allows for such angular or swinging movement in the plane of the rim as may occur as the different sections engage and disengage from the surface of the road in rotation, while holding the sections against movement transversely to the wheel. In order to further strengthen the rim against such transverse movement I may provide a series of rigid radial flanges 26 on the felly members which project on opposite sides of the rim sections.

Encircling the bolts 22 are coiled expansion springs 27 which bear between the felly members 13 and rim sections 18, the inner faces of the latter being preferably recessed as at 28 to receive the outer ends of the springs.

As shown in the drawings the tread and rim sections of the wheel are preferably spaced circumferentially apart a short distance to allow of relative movement the rim sections 20 being similarly spaced while each alternate tread section is preferably formed at the ends with projecting flanges 29 which are accommodated in angular recesses 30 on the adjacent sections. The tread sections 19 are also formed with suitable recesses 31 to receive the outer ends of the bolts.

In constructing the tread surfaces of these tread sections I preferably provide them with frictional devices which are varied in the different sections as shown in Fig. 2, being preferably arranged in sets of three with the center one having crescent shaped projections 32, and the adjacent ones having rounded knobs and depressions 33 and 34 respectively.

As will be apparent my improved wheel is of simple construction and the various parts thereof may be readily renewed individually when desired, while the resiliency may be varied as desired by adjusting the bolts 22 in the bosses 21.

Having thus described my invention what I claim as new and desire to protect by Letters Patent of the United States is as follows:

1. In a vehicle wheel, a felly, a series of metallic rim sections resiliently mounted on said felly and having their adjacent ends spaced a short distance apart circumferentially of the wheel, separate resilient tread sections fixed on said rim sections, certain ones of said tread sections having projections at their ends overlapping the ends of adjacent sections.

2. In a vehicle wheel, a felly, a series of metallic rim sections resiliently mounted on said felly and having their adjacent ends spaced a short distance apart circumferentially of the wheel, separate resilient tread sections fixed on said rim sections, certain ones of said tread sections having their surface portions extended to overlap the ends of adjacent tread sections, the main bodies of said tread sections being spaced circumferentially from one another in correspondence to the spacing of said rim sections.

3. In a vehicle wheel, a felly, a series of metallic rim sections resiliently mounted on said felly and having their adjacent ends spaced a short distance apart circumferentially of the wheel, separate resilient tread sections fixed on said rim sections, the alternate tread sections having respectively projections and recesses at their ends, the said projections being accommodated in the said recesses.

4. In a vehicle wheel, a felly, a series of bolts carried thereby to have free radial movement and projecting therebeyond, a series of rim sections having the said bolts screwed in pairs thereinto and coiled expansion springs surrounding said bolts and interposed between said felly and said rim sections, heads upon said bolts, and means upon said felly engaging said heads to prevent angular movement of the bolts transversely of the wheel while permitting such movement in the plane of the wheel.

5. In a vehicle wheel, a felly, a series of bolts carried thereby to have free radial movement and projecting therebeyond, a series of rim sections having the said bolts screwed in pairs thereinto and coiled expansion springs surrounding said bolts and interposed between said felly and said rim sections, heads upon said bolts, and means upon said felly engaging said heads to prevent angular movement of the bolts transversely of the wheel while permitting such movement in the plane of the wheel, said means comprising sockets in said felly having the walls thereof flared in the plane of the wheel but parallel transversely thereto.

In testimony whereof I have affixed my signature.

JOSEPH ARDO.